No. 876,588. PATENTED JAN. 14, 1908.
L. T. RASMUSSEN.
CATTLE STANCHION.
APPLICATION FILED JULY 31, 1907.

2 SHEETS—SHEET 1.

Witnesses
G. R. Thomas
John Powers

Inventor.
Ludwig T. Rasmussen
By Barnabus Chandler
Attorneys

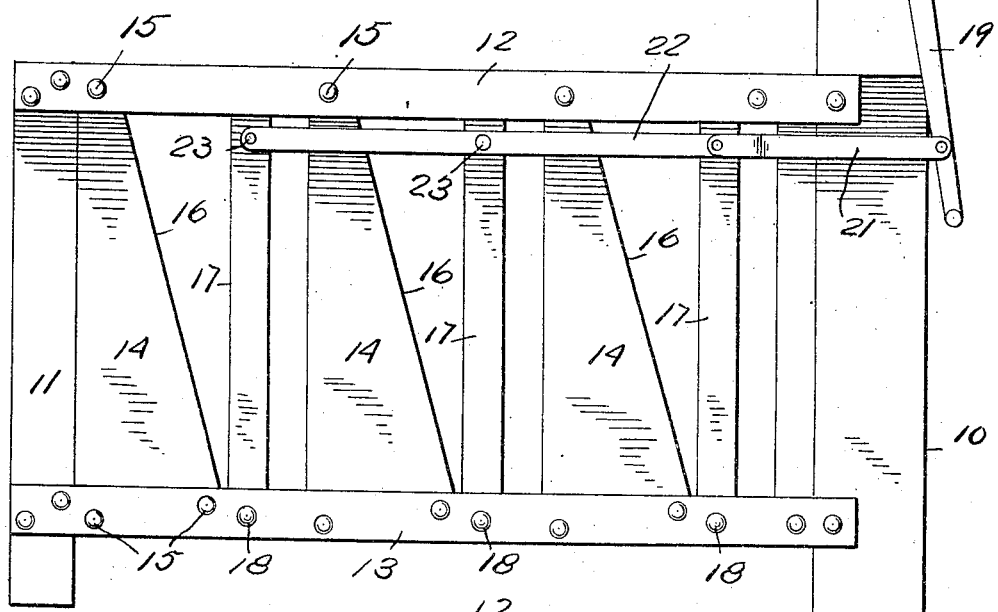
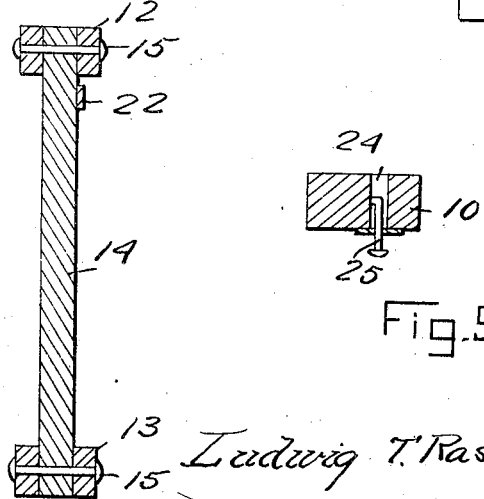

UNITED STATES PATENT OFFICE.

LUDWIG T. RASMUSSEN, OF NEVADA, IOWA.

CATTLE-STANCHION.

No. 876,588.          Specification of Letters Patent.          Patented Jan. 14, 1908.

Application filed July 31, 1907. Serial No. 386,477.

*To all whom it may concern:*

Be it known that I, LUDWIG T. RASMUSSEN, a citizen of the United States, residing at Nevada, in the county of Story, State of Iowa, have invented certain new and useful Improvements in Cattle-Stanchions; and I do hereby declare the following to be a full, clear, and exact description of the invention, such as will enable others skilled in the art to which it appertains to make and use the same.

This invention relates to new and useful improvements in cattle stanchions and it has more particular reference to a device of this character comprising stationary bars and movable bars located in front of the several stalls and in connection with which novel means are employed for operating the movable bars simultaneously with relation to the stationary bars to open or close the stalls.

Figure 1:
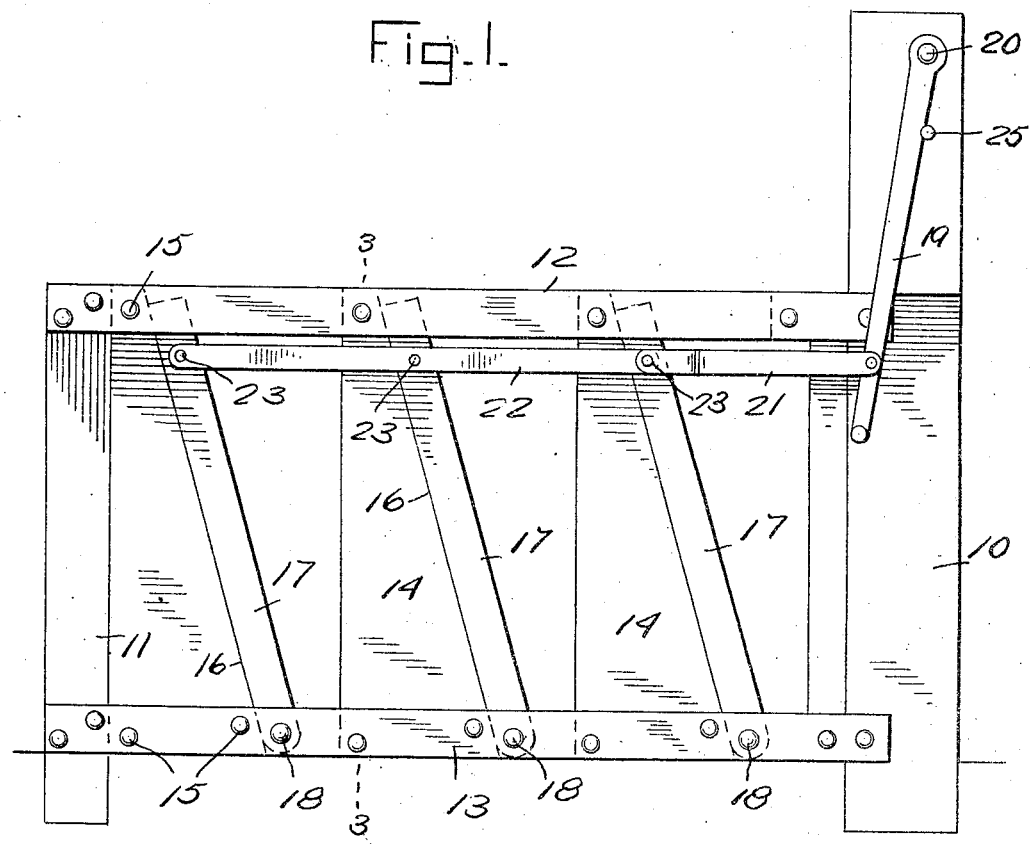
Figure 4:
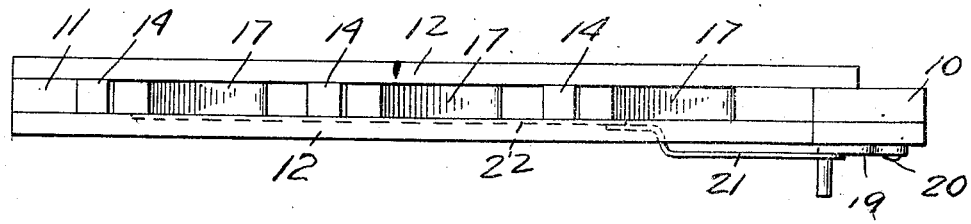

The invention aims as a primary object to provide a cattle stanchion of the above type involving a novel construction, combination and arrangement of parts, the details of which will appear in the course of the following description, in which reference is had to the accompanying drawings, forming a part of this specification, like characters of reference designating similar parts, throughout the several views, wherein:

Figure 1 is an elevation showing the cattle stanchion constructed in accordance with the present invention with the bars in position for admission to the stalls. Fig. 2 is a similar view with the bars in position to close the stalls. Fig. 3 is a section on the line 3—3 of Fig. 1. Fig. 4 is a top plan view of the stanchion. Fig. 5 is a horizontal section illustrating a sliding bolt comprehended in the invention, for locking the operating lever in either of its positions.

In the accompanying drawings, the numeral 10 designates a post at one end of the row of stalls and the numeral 11 designates a post at the other end of such row. The posts 10 and 11, are connected by upper and lower bars 12 and 13, arranged in pairs and in spaced parallel relation.

The stationary stanchions are designated by the numeral 14 and have their ends disposed in the space between the respective pairs of bars 12 and 13, the said bars 14 being held by bolts or other fastening devices 15. The bars 14 have corresponding sides inclined as at 16 to coöperate with bars 17 which have their lower ends pivoted between the bars 13 as at 18, and their upper ends disposed between the bars 12, as guides.

A lever 19 has its upper end pivoted, as at 20, to the post 10, and below the pivot 20, has pivotal connection with a link 21, the latter, being in turn pivoted to the end of a bar 22. The bar 22 has pivotal connection as at 23 with the several bars 17, adjacent the upper ends thereof.

As shown more particularly in Fig. 5, the post 10 is provided adjacent the lever 19, with a horizontal opening 24, in which a suitably constructed bolt 25 is mounted for sliding movement. The bolt 25 serves the function of a detent and in this function is designed to engage the lever 19 at opposite sides thereof, to prevent displacement of said lever from either of its positions, in the respective operations of the bar 17, as shown in Figs. 1 and 2.

In use, it is assumed that the lever 19 is swung to the left and that the stalls are open to admission as shown in Fig. 1. When the cattle have entered the stalls and it is desired to close the same, the bolt 25 is pushed inwardly and the lever 19 is swung to the right, thereby moving the bars 17 against the straight vertical faces of the adjacent bars 14, and narrowing the opening between said bars so as to prevent the cattle from leaving the stalls.

The operative connections described, comprising the lever 19, the link 21 and the bar 22, afford a means for quickly and easily operating the bars 17 in unison and such operative means is not liable to become inoperative by reason of slack or loose play or through breakage or disconnection of the parts.

The invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. In stanchions, the combination with a frame including end posts, upper and lower bars connecting the same, spaced vertical bars held in fixed relation between said upper and lower bars, and bars pivoted to said lower bar at corresponding sides of said several fixed bars, and being movable towards and away from said fixed bars, of a horizontal bar pivoted to the upper ends of all of said pivoted bars, a lever pivoted at its upper end to one of said posts, said lever depending from its pivot, a link pivoted to the end of the said bar having pivotal connection with said pivoted bars, the said link being pivoted to said lever adjacent the free lower end thereof, and a displaceable bolt engaged in the post to which said lever is pivoted, said bolt being designed to engage said lever at opposite sides thereof to prevent displacement of the same from either of the positions to which it may be moved on its pivot.

In testimony whereof, I affix my signature, in presence of two witnesses.

LUDWIG T. RASMUSSEN.

Witnesses:
H. B. CRADDICK,
W. H. BROWN.